United States Patent [19]

Schumann

[11] 4,356,005
[45] Oct. 26, 1982

[54] SEPARATION OF GASES

[75] Inventor: Werner A. Schumann, Pretoria, South Africa

[73] Assignee: Atomic Energy Board, Pretoria, South Africa

[21] Appl. No.: 249,553

[22] Filed: Mar. 31, 1981

[30] Foreign Application Priority Data

Apr. 21, 1980 [ZA] South Africa ............... 80/2363

[51] Int. Cl.³ ........................................... B01D 59/20
[52] U.S. Cl. ............................................ 55/17; 55/71; 55/267
[58] Field of Search ................. 55/16, 17, 66, 71, 158, 55/267, 277

[56] References Cited

U.S. PATENT DOCUMENTS

| | | | |
|---|---|---|---|
| 2,609,059 | 9/1952 | Benedict | 55/16 |
| 2,617,493 | 11/1952 | Jones | 55/16 |
| 3,208,197 | 9/1965 | Simon et al. | 55/16 |
| 3,250,080 | 5/1966 | Garwin | 55/16 X |
| 3,989,483 | 11/1976 | Becker et al. | 55/17 |
| 4,040,801 | 8/1977 | Dyer et al. | 55/16 |
| 4,092,130 | 5/1978 | Wikdahl | 55/17 X |
| 4,104,037 | 8/1978 | Garrett et al. | 55/16 |
| 4,119,417 | 10/1978 | Heki et al. | 55/16 X |
| 4,167,244 | 9/1979 | Stark | 55/17 X |
| 4,193,775 | 3/1980 | Wang | 55/17 |

FOREIGN PATENT DOCUMENTS 266396 2/1927 United Kingdom .
1468844 3/1977 United Kingdom .

OTHER PUBLICATIONS

Olander, "Design of Ideal Cascades of Gas Centrifuges . . . ", Nuclear Science and Eng.: 60, No. 4, 8/76, pp. 421–434.

Becker, "The Separation Nozzle Process for Enrichment of Uranium-235", Prog. in Nuclear Eng., vol. 1, No. 1, pp. 27–39, 1977.

Primary Examiner—Robert H. Spitzer
Attorney, Agent, or Firm—Ladas & Parry

[57] ABSTRACT

The invention provides a method of operating a cascade gas separation process and a gas separation cascade (10) useful for uranium refining and employing a carrier gas. The method and cascade of the invention involve arranging relative gas flow rates between at least some modules (12) in the cascade so that the relative proportions of process gas leaving and entering each of said modules are such that there is a substantially constant molar flow rate of gas in each direction along the cascade through said modules. The proportion of carrier gas relative to process gas increased in opposite directions from the feed (14) to the opposite ends (20, 22) of the cascade and the modules through which the constant molar flow rate takes place have substantially the same size, capacity and construction.

20 Claims, 3 Drawing Figures

SEPARATION OF GASES

This invention relates to a method of operating a cascade process for separating a process gas feed comprising several components into a product gas which is enriched relative to the process gas feed in respect of a desired component and a stripped gas which is depleted relative to the process gas feed in respect of the desired component, a carrier gas being circulated with the process gas along the cascade from the stripper end of the cascade to the product end of the cascade where it is separated from the process gas, and thence back to the stripper end of the cascade where it is reintroduced into the cascade, and the process gas feed being introduced into the cascade at a position intermediate the stripper end and the product end. The invention also relates to such a gas separation cascade.

According to the invention, in the operation of a cascade process for separating a process gas feed comprising several components into a product gas which is enriched relative to the process gas feed in respect of a desired component and a stripped gas which is depleted relative to the process gas feed in respect of the desired component, a carrier gas being circulated with the process gas along the cascade from the stripper end of the cascade to the product end of the cascade where it is separated from the process gas, and thence back to the stripper end of the cascade where it is reintroduced into the cascade, the process gas feed being introduced into the cascade at a position intermediate the stripper end and the product end, and the cascade comprising a plurality of modules each including one or more gas separation elements for separating a stream of process gas received from an external supply and/or from one or more other modules in the cascade into an enriched stream and a depleted stream which pass on to other modules in the cascade, there is provided the method whereby, for a plurality of the modules, the relative proportions of process gas leaving and entering each module are selected such that there is a substantially constant molar flow rate of gas in each direction along the cascade through said plurality of modules, the proportion of carrier gas relative to process gas increasing progressively in a direction from the feed to the product end of the cascade, and the proportion of carrier gas relative to process gas increasing progressively in a direction from the feed to the stripper end of the cascade.

All the modules through which the substantially constant molar flow rate takes place, may be of substantially the same size, capacity and construction, and said constant molar flow rate may be caused to take place through all the modules of the cascade.

Instead, the cascade may be divided into several portions, each portion comprising a plurality of modules, the relative proportions of process gas leaving and entering each module in each portion being selected such that there is a substantially constant molar flow rate of gas in each direction along said portion through its modules. The cascade may thus be divided into two portions, the one portion comprising the stripper section of the cascade and part of the enriched section of the cascade, and the other portion comprising the remainder of the enriched section of the cascade.

All the modules of each portion may be of substantially the same size, capacity and construction, but differing with regard to size, capacity and/or construction from the modules of the other portions. In this case the size and capacity of the modules may decrease progressively in a direction from the feed to the stripper end of the cascade and/or from the feed to the product end of the cascade.

The method may include the step of withdrawing a mixture of process gas and carrier gas from the cascade between adjacent portions of the cascade, subjecting the mixture to a gas separation whereby the carrier gas is separated from the process gas, returning the separated process gas to the cascade between said portions from between which the mixture was withdrawn, and circulating the separated carrier gas back to the stripper end of the cascade. The separation of carrier gas from process gas may take place in a plurality of modules forming a carrier gas separation cascade, the modules of the carrier gas separation cascade and the modules of the portion on the enriched side of the position where the mixture is withdrawn and the process gas returned, all being of substantially the same size, capacity and construction, and having substantially the same molar flow rate of gas therethrough.

The method may include, at the product end of the cascade, withdrawing gas from the cascade and separating it into carrier gas and process gas, some of the separated process gas being withdrawn as enriched product and the remainder being returned to the product end of the cascade and the separated carrier gas being circulated back to the stripper end of the cascade, the separation of carrier gas from process gas taking place in a plurality of modules forming a carrier gas separation cascade and the modules of the carrier gas separation cascade and the modules of the enriched section at the product end being of substantially the same size, capacity and construction and having substantially the same molar flow rate of gas therethrough.

The components of the process gas may be separated from each other by an isotopic separation process. The process gas may be a two-component gas, the carrier gas being of a lower molecular weight than either of the components. Thus, for example, the process gas may comprise a mixture of uranium$^{235}$ hexafluoride ($U^{235}F_6$) and uranium$^{238}$ hexafluoride ($U^{238}F_6$), the carrier gas being hydrogen.

Further according to the invention, there is provided a gas separation cascade for separating a process gas feed comprising several components into a product gas which is enriched relative to the process gas feed in respect of a desired component and a stripped gas which is depleted relative to the process gas feed in respect of the desired component, which cascade comprises a plurality of modules each containing one or more gas separation elements for separating a stream of process gas into an enriched stream and a depleted stream, the modules being arranged to extend in series from the stripper end of the cascade to the product end of the cascade, the cascade having an outlet at its product end for an enriched product stream and an outlet at its stripper end for a stripped product stream, and a process gas feed inlet intermediate its ends which divides it into a stripper section and an enriched section, the modules being interconnected together so that each module can receive gas from at least one other module and/or the inlet and can discharge gas to at least one other module and/or one of the outlets, the cascade including carrier gas separator means connected to the product end for withdrawing a mixture of carrier gas and process gas from the product end of the cascade, for separating carrrier gas from process gas, and for returning separated process gas to the cascade and for circulating separated carrier gas to the stripper end, and means for circulating gas between the modules so that there is a net flow of carrier gas from the stripper end of the cascade to the product end of the cascade and a net flow of process gas from the inlet to the outlets, the cascade including a plurality of modules of substantially the same size, capacity and construction and the means for circulating the gas being arranged and constructed to cause gas to enter and leave each of said plurality of modules such that there is a substantially constant molar flow rate of gas in each direction along the cascade through each of said modules having the same size, capacity and construction, and such that the proportion of carrier gas relative to process gas increases progressively from the inlet to the enriched product outlet, and from the inlet to the stripped product outlet.

All the modules may be substantially of the same size, capacity and construction.

Instead, the cascade may be divided into several portions, all the modules of each portion being of substantially the same size, capacity and construction and different in size, capacity and construction from the modules of the other portion(s), the means for circulating the gas being arranged and constructed so that in use a substantially constant molar flow rate of gas in each direction along the cascade can be obtained through each module of each portion, which molar flow rate through the modules of each portion is different from the molar flow rate through the modules of the other portion(s). Thus the cascade may be divided into two portions, the one portion comprising the stripper section of the cascade and part of the enriched section, and the other portion comprising the remainder of the enriched section.

The cascade may include separator means for withdrawing a mixture of carrier gas and process gas from between each adjacent pair of portions and for separating said gas into process gas and carrier gas, the separator means being arranged to return the separated process gas to the cascade between said portions and to circulate the separated carrier gas to the stripper end. The separator means may comprise a plurality of modules forming a carrier gas separation cascade, the modules of the carrier gas separation cascade and the modules of the portion on the enriched side of the position where the mixture is withdrawn and the process gas returned, all being of substantially the same size, capacity and construction.

The separator means connected to the product end of the cascade may comprise a plurality of modules forming a carrier gas separation cascade, the modules of the carrier gas separation cascade and the modules of the enriched section at the product end being of substantially the same size, capacity and construction.

In other words, where the carrier gas is relatively low in molecular weight (e.g. hydrogen) compared with the process gas (e.g. a mixture of uranium$^{235}$ hexafluoride and uranium$^{238}$ hexafluoride), the total volume gas passing along the cascade in a direction from the stripper end of the cascade to the product end through said plurality of modules, will be substantially constant; the total volume of gas passing along the cascade in a direction from the product end to the stripper end through said plurality of modules, will be substantially constant; and, moving in opposite directions away from the feed, the average molecular weight of the gas in each of said plurality of modules will decrease progressively. It will be appreciated however, that the volume or molar flow in a direction from the stripper end to the product end through said plurality of modules, will be greater than the molar or volume flow through said plurality of modules in the opposite direction along the cascade, as there is a net flow of carrier gas from the stripper end to the product end of the cascade.

The invention will now be described, by way of example, with reference to the accompanying diagrammatic drawings, in which.

Figure 1:
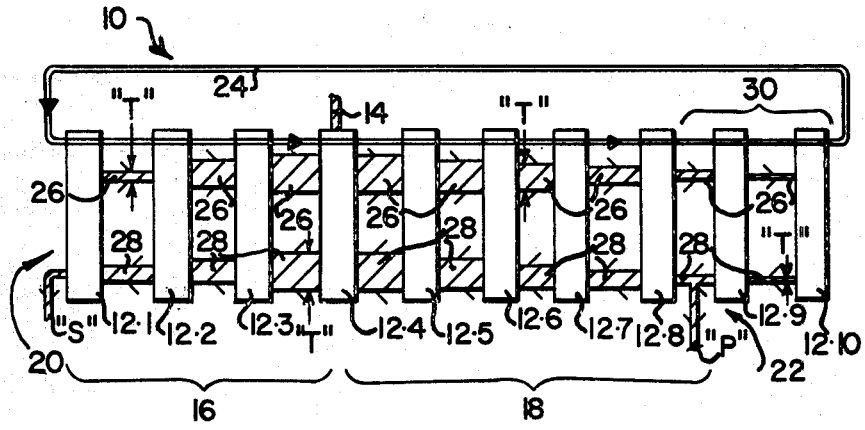
FIG. 1 shows a schematic representation of a cascade flow diagram when operated in accordance with the invention.

In FIG. 1 of the drawings, reference numeral 10 generally designates a schematic flow diagram of a cascade operated in accordance with the method of the invention. The cascade 10 comprises a series of separation modules 12.1 to 12.10 each typically comprising (but not shown) one or more isotope separation elements (e.g. for separating $U^{235}F_6$ from $U^{238}F_6$), one or more compressors and one or more heat exchangers to relieve heat build-up caused by the compressors. Each module will include appropriate ancillary service equipment such as to make provision for connection thereof into the cascade for gas flow into and out of the module, provision for internal circulation of gas in the module if necessary, provision for measurement of gas pressures, temperatures and flow rates, control equipment etc. The internal ports of each module can be of any suitable conventional construction and are therefore not described in any detail.

A process gas feed stream comprising a mixture of $U^{235}F_6$ and $U^{238}F_6$ is designated 14 and is shown entering module 12.4 intermediate the ends of the cascade, the stripper section of the cascade being designated 16 and being located to one side of the feed 14 to comprise the modules 12.1 to 12.4; and the enriched section of the cascade being designated 18 and being located to the other side of the feed 14 and comprising the modules 12.4 to 12.8.

A stripped stream 'S', depleted with respect to $U^{235}F_6$ leaves the stripper end 20 of the cascade at module 12.1, and a product stream 'P', enriched with respect to $U^{235}F_6$ leaves the product end 22 of the cascade at the module 12.8. A circulating stream of carrier gas is designated 24; the process gas stream leaving each module in the direction of the product end is designated 26; and the process gas stream leaving each module in the direction of the stripper end is designated 28.

By virtue of the inherent nature of an ideal cascade, the amounts of process gas passing in opposite directions between any adjacent pair of modules decreases steadily, the further the pair is from the feed, the amounts being substantially the same and differing by the amount removed in the stripped stream 'S' or product stream 'P', depending respectively on whether the pair of modules is in the stripper section or in the enriched section. Furthermore, as in cascades employing a carrier gas, the carrier gas passes in opposite directions between each adjacent pair of modules with flow in the direction of the product end being greater than flow in the opposite direction, it will be appreciated that stream 24 only designates the net flow of carrier gas flow, which is substantially constant along the cascade.

In accordance with the method of the invention the cascade is arranged to operate so that the flow of carrier gas in opposite directions between each pair of modules is such that the total molar gas flow rate (i.e. process gas together with carrier gas) from one module to another in the direction towards the product end is substantially constant, and, so that the total molar gas flow in the opposite direction from one module to another along the cascade is substantially constant. For constant temperatures and pressures, this means that the total volume flow rate in each direction will be substantially constant, but bearing in mind that the process gas has a higher molecular weight than the carrier gas, the mole ratio of carrier gas to process gas will increase steadily in a direction away from the feed, while the total mass of gas and the total mass of process gas flowing will decrease steadily together with the proportion of process gas. The decrease in total mass of process gas flowing is indicated in FIG. 1 by the thicknesses 'T' of the various streams 26 and 28, which thicknesses vary and represent, for a typical case as shown in FIG. 1, the amounts of process gas in the various streams.

As the amount of process gas decreases moving away from the feed and while the total molar flow in each direction remains substantially constant, the ratio in each module between the average molecular mass of the total gas (process gas with carrier gas) and the average molecular mass of the carrier gas will also decrease (as it is directly related to the decrease in process gas flow) together with a decrease in the concentration of process gas in each module.

Module 12.8 is the final module of the enriched section of the cascade, and the stream 26 leaving it is at essentially the same composition as the product stream 'P' as regards the components of the process gas the modules 12.9 and 12.10 acting simply as a gas separator section 30 to separate carrier gas from process gas. By virtue of the usually substantial differences in the molecular weights between the process and carrier gases in uranium enrichment (the latter being lighter), this separation is easy and simple and could equally easily be effected by freeze separation or other conventional methods, although modules are shown which are the same as the modules in the stripper and enriched sections, for standardization of equipment. A portion of the separation of carrier and process gases actually occurs in modules 12.4 to 12.8 i.e. in the enriched section 18.

Figure 2:
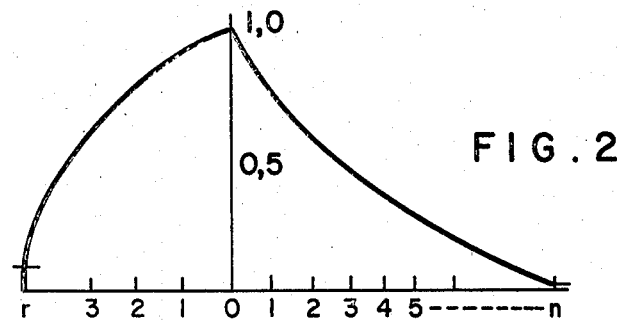
FIG. 2 shows a typical plot of the variation of process gas concentration along a cascade.

FIG. 2 shows a typical ideal plot of the ratio of the product of the process gas mass flow from one module to another and the overall enrichment factor of the separating element(s) in that module to the corresponding product for the feed point module (in FIG. 1 module 12.4), against module number (the feed module being designated 0). The enrichment factor is much less than 1 and if it is constant along the cascade the plot is of the ratio of process gas mass flow from one module to another to process gas flow rate from the feed module, against module number. The enrichment factor however may vary along the cascade, in which case the ideal plot may differ slightly from the one shown in FIG. 2.

It is desirable in practice to approach this ideal plot as closely as possible and it will be appreciated that with the method of operation of the present invention this plot can be very closely approximated, while, importantly, using modules which are all of the same size.

Thus, by tailoring the amount of carrier gas passing between adjacent modules in the fashion described above with reference to FIG. 1, it can be ensured that for each module the ratio in question falls on or at least very close to the ideal plot of FIG. 2.

Figure 3:
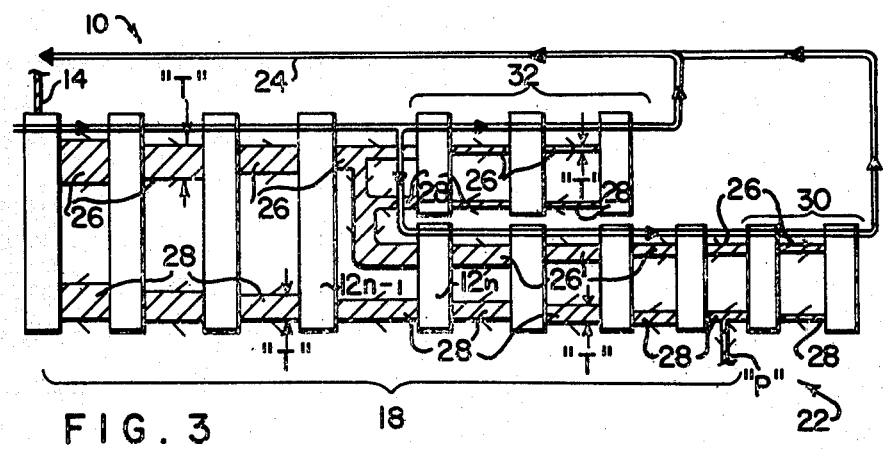
FIG. 3 shows another cascade flow diagram according to the invention.

In FIG. 3, the same reference numerals are used as in FIG. 1, unless otherwise specified. The enriched section 18 is shown provided with two separator sections, namely a section 30 corresponding to section 30 in FIG. 1, and an additional carrier gas separator section 32 introduced into the cascade between the feed point module and the product end of the cascade. The modules between the separator section 32 and the product end of the cascade are small relative to the other modules and thus have a lower overall capacity. Consequently, to keep the plot of the cascade in the ideal condition shown in FIG. 2, it is necessary correspondingly to increase the average molecular mass of the total gas for the module 12$n$, i.e. the small module closest to the separator section 32, to a value higher than the corresponding average molecular mass for the large module 12$n-1$, i.e. the large module closest to said section 32. This means that the ratio of the product of process gas flow from module 12$n$ to the adjacent modules and the enrichment factor for the module 12$n$, to the corresponding product for the feed point module can once again be on the plot of FIG. 2.

The present invention is of particular utility for gas or isotope separation cascades where each module is a large, complex and extremely costly unit, both in terms of hardware cost and in terms of capital intensive development work involved in designing prototype modules having a particular size and capacity.

It has been proposed to operate such cascades with a constant mole ratio between carrier gas and process gas in each module. This however necessitates modules of progressively smaller sizes, as the process gas flow decreases in opposite directions away from the feed point module. The development cost of numerous prototype modules of different sizes is however prohibitive.

Another proposal, is to use modules of a constant size and design, once again with a constant mold ratio in each module between process gas and carrier gas. This has the advantage that development costs of prototypes are kept to a minimum, but in this case it is impossible to achieve progressively reduced process gas flow from module to module in opposite directions away from the feed point module. Therefore intermodular process gas flows deviate substantially from the ideal condition shown in FIG. 2. A penalty is consequently paid in terms of prohibitive power consumption especially in modules remote from the feed point and in terms of extra modules needed to separate process and carrier gas from a mixture having a relatively high process gas concentration.

According to the present invention, however, in contrast, modules of a constant size and design can be used with advantage, and, although it is necessary to have the same degree of internal circulation in terms of volume to operate each module at the maximum efficiency for that module and for the maximum efficiency of the cascade as a whole, the further the module is from the feed point module, the higher is the proportion of carrier gas in the module circulated. Thus, with a similar or the same net mass flow of carrier gas from module to module, with the same net mass flow of product gas from module to module, and with the same volume of gas being internally circulated by said module, the mass of gas internally circulated is substantially less. Bearing in mind that the molecular mass of the total gas decreases from module to module corresponding pressure ratios decrease for compressors running at substantially constant speeds. In practice this leads to a large saving of power consumption. Even when a constant mole ratio rather than the method of the present invention is used, and the cost of developing several module sizes is incurred, this only leads to a partial improvement and most of the modules will nevertheless operate at positions off the plot of FIG. 2 with a consequent heavy wasted power penalty.

FIG. 3 and the embodiment described with reference thereto however demonstrate that the present invention is flexible in balancing various costs. Thus in situations where, even with the power saving permitted by varying the mole ratio of process gas to carrier gas from module to module, fixed plants costs are felt to be excessive, smaller and less expensive modules can be introduced where appropriate, leading to both a reduction in manufacturing cost (materials, labour etc) and a further reduction in power cost, although at the penalty of having to develop additional prototypes.

It is to be noted that in FIG. 2 the vertical axis shows:

$$\frac{\text{process gas mass flow from each module} \times \text{overall enrichment factor of the separating element(s) in that module}}{\text{process gas mass flow from feed point module} \times \text{overall enrichment factor of the separating element(s) in the feed point module}}$$

and the horizontal axis shows:

module number, i.e. position of module in cascade.

It is also to be noted that the cascade of FIG. 3 is divided into two portions namely on the one hand a portion comprising the stripper section (not shown and similar to FIG. 1) and the part of the enriched section between the feed 14 and the separator or section 32, and on the other hand a portion comprising the remainder of the enriched section between the separator section 32 and the separator section 30. All the modules of the former portion (ie the modules up to $12_{n-1}$) are of substantially the same size capacity and construction, and are larger than the modules of the latter portion (ie the modules $12_n$ and above), which are likewise of substantially the same size, capacity and construction.

I claim:

1. In the operation of a cascade process for separating a process gas feed comprising several components into a product gas which is enriched relative to the process gas feed in respect of a desired component and a stripped gas which is depleted relative to the process gas feed in respect of the desired component, a carrier gas having a lower molecular weight than the process gas being circulated with the process gas along the cascade from the stripper end of the cascade to the product end of the cascade where it is separated from the process gas, and thence back to the stripper end of the cascade where it is reintroduced into the cascade, the process gas feed being introduced into the cascade at a position intermediate the stripper end and the product end, and the cascade comprising a plurality of modules each including one or more gas separation elements for separating a stream of process gas received from an external supply and/or from one or more other modules in the cascade into an enriched stream and a depleted stream which pass on to other modules in the cascade, the method whereby, for a plurality of the modules, the relative proportions of process gas leaving and entering each module are selected such that there is a substantially constant molar flow rate of gas in each direction along the cascade through said plurality of modules, the proportion of carrier gas relative to process gas increasing progressively in a direction from the feed to the product end of the cascade, and the proportion of carrier gas relative to process gas increasing progressively in a direction from the feed to the stripper end of the cascade, the mass flow rate of the gas decreasing progressively in a direction from the feed to the product end of the cascade, and in a direction from the feed to the stripper end of the cascade.

2. A method as claimed in claim 1, in which all the modules through which the substantially constant molar flow rate takes place are of substantially the same size, capacity and construction.

3. A method as claimed in claim 1, in which said constant molar flow rate is caused to take place through all the modules of the cascade.

4. A method as claimed in claim 1, in which the cascade is divided into several portions, each portion comprising a plurality of modules, the relative proportions of process gas leaving and entering each module in each portion being selected such that there is a substantially constant molar flow rate of gas in each direction along said portion through its modules.

5. A method as claimed in claim 4, in which the cascade is divided into two portions, the one portion comprising the stripper section of the cascade and part of the enriched section of the cascade, and the other portion comprising the remainder of the enriched section of the cascade.

6. A method as claimed in claim 4, in which all the modules of each portion are of substantially the same size, capacity and construction, but differ with regard to size, capacity and/or construction from the modules of the other portions.

7. A method as claimed in claim 4, in which the size and capacity of the modules decreases progressively in a direction from the feed to the stripper end of the cascade and/or from the feed to the product end of the cascade.

8. A method as claimed in claim 4, which includes the step of withdrawing a mixture of process gas and carrier gas from the cascade between adjacent portions of the cascade, subjecting the mixture to a gas separation whereby the carrier gas is separated from the process gas, returning the separated process gas to the cascade between said portions from between which the mixture was withdrawn, and circulating the separated carrier gas back to the stripper end of the cascade.

9. A method as claimed in claim 8, in which the separation of carrier gas from process gas takes place in a plurality of modules forming a carrier gas separation cascade, the modules of the carrier gas separation cascade and the modules of the portion on the enriched side of the position where the mixture is withdrawn and the process gas returned, all being of substantially the same size, capacity and construction, and having substantially the same molar flow rate of gas therethrough.

10. A method as claimed in claim 1, which includes, at the product end of the cascade, withdrawing gas from the cascade and separating it into carrier gas and process gas, some of the separated process gas being withdrawn as enriched product and the remainder being returned to the product end of the cascade and the separated carrier gas being circulated back to the stripper end of the cascade, the separation of carrier gas from process gas taking place in a plurality of modules forming a carrier gas separation cascade and the modules of the carrier gas separation cascade and the modules of the enriched section at the product end being of substantially the same size, capacity and construction and having substantially the same molar flow rate of gas therethrough.

11. A method as claimed in claim 1, in which the components of the process gas are separated from each other by an isotopic separation process.

12. A method as claimed in claim 1, in which the process gas is a two-component gas and in which the carrier gas is of a lower molecular weight than either of the components.

13. A method as claimed in claim 12, in which the process gas comprises a mixture of uranium$^{235}$ hexafluoride ($U^{235}F_6$) and uranium$^{238}$ hexafluoride ($U^{238}F_6$), and the carrier gas is hydrogen.

14. A gas separation cascade for separating a process gas feed comprising several components into a product gas which is enriched relative to the process gas feed in respect of a desired component and a stripped gas which is depleted relative to the process feed in respect of the desired component, the cascade comprising a plurality of modules each containing one or more gas separation elements for separating a stream of process gas into an enriched stream and a depleted stream, the modules being arranged to extend in series from the stripper end of the cascade to the product end of the cascade, the cascade having an outlet at its product end for an enriched product stream and an outlet at its stripper end for a stripped product stream, and a process gas feed inlet intermediate its ends which divides it into a stripper section and an enriched section, the modules being interconnected together so that each module can receive gas from at least one other module and/or one of the outlets, the cascade including carrier gas separator means connected to the product end for withdrawing a mixture of carrier gas and process gas from the product end of the cascade, for separating carrier gas from process gas, and for returning separated process gas to the cascade and for circulating separated carrier gas to the stripper end, and means for circulating gas between the modules so that there is a net flow of carrier gas from the stripper end of the cascade to the product end of the cascade and a net flow of process gas from the inlet to the outlets, the cascade including a plurality of modules of substantially the same size, capacity and construction and the means for circulating the gas being arranged and constructed to cause gas to enter and leave each of said plurality of modules such that there is a substantially constant molar flow rate of gas in each direction along the cascade through each of said modules having the same size, capacity and construction, and such that the proportion of carrier gas relative to process gas increases progressively from the inlet to the enriched product outlet, and from the inlet to the stripped product outlet, so that for a carrier gas which has a molecular weight which is lower than that of the process gas, the mass flow rate decreases progressively from the inlet to the enriched product outlet and from the inlet to the stripped product outlet.

15. A cascade as claimed in claim 14, in which all the modules are substantially of the same size, capacity and construction.

16. A cascade as claimed in claim 14, which is divided into several portions, all the modules of each portion being of substantially the same size, capacity and construction and different in size, capacity and construction from the modules of the other portion(s), the means for circulating the gas being arranged and constructed so that in use a substantially constant molar flow rate of gas in each direction along the cascade can be obtained through each module of each portion, which molar flow rate through the modules of each portion is different from the molar flow rate through the modules of the other portion(s).

17. A cascade as claimed in claim 16, which is divided into two portions, the one portion comprising the stripper section of the cascade and part of the enriched section, and the other portion comprising the remainder of the enriched section.

18. A cascade as claimed in claim 16, which includes separator means for withdrawing a mixture of carrier gas and process gas from between each adjacent pair of portions and for separating said gas into process gas and carrier gas, the separator means being arranged to return the separated process gas to the cascade between said portions and to circulate the separated carrier gas to the stripper end.

19. A cascade as claimed in claim 18, in which the separator means comprises a plurality of modules forming a carrier gas separation cascade, the modules of the carrier gas separation cascade and the modules of the portion on the enriched side of the position where the mixture is withdrawn and the process gas returned, all being of substantially the same size, capacity and construction.

20. A cascade as claimed in claim 14, in which the separator means connected to the product end of the cascade comprises a plurality of modules forming a carrier gas separation cascade, the modules of the carrier gas separation cascade and the modules of the enriched section at the product end being of substantially the same size, capacity and construction.

* * * * *

UNITED STATES PATENT AND TRADEMARK OFFICE
CERTIFICATE OF CORRECTION

PATENT NO. : 4,356,005

DATED : October 26, 1982

INVENTOR(S) : SCHUMANN, Werner Adolf

It is certified that error appears in the above—identified patent and that said Letters Patent is hereby corrected as shown below:

The Abstract, line 11, replace "increased" by --increases--.

Column 6, line 42, replace "mold" by --mole--.

Signed and Sealed this

Twentieth Day of December 1983

[SEAL]

Attest:

GERALD J. MOSSINGHOFF

*Attesting Officer*  *Commissioner of Patents and Trademarks*